UNITED STATES PATENT OFFICE.

C. M. TESSIÉ DU MOTAY, OF PARIS, FRANCE, AND AUGUSTE I. ROSSI, OF NEW YORK, N. Y.

PRODUCTION OF COLD IN ICE-MACHINES, &c.

SPECIFICATION forming part of Letters Patent No. 224,246, dated February 3, 1880.

Application filed October 20, 1879.

*To all whom it may concern:*

Be it known that we, C. M. TESSIÉ DU MOTAY, of Paris, France, and AUGUSTE I. ROSSI, of New York, N. Y., United States, have invented a new and useful Improvement in Production of Cold, which invention is fully set forth in the following specification.

This invention relates to the production of cold for the manufacture of ice or for general refrigerating purposes by means of the volatilization of a liquid or liquefied refrigerating agent and condensation thereof again to a liquid state. These operations are performed alternately and continuously, and are carried on in refrigerating, or, as generally called, "ice" machines. Heretofore the refrigerant used, commonly anhydrous sulphurous acid (sulphurous anhydride or sulphurous dioxide) or ammonia, has been condensed by direct pressure, aided more or less by the circulation of a cooling medium. In practical operation, especially with either of the gases named, owing to the great elasticity and tension of their vapor at ordinary or even low temperatures, powerful compression apparatus and hermetically-tight receivers of great strength are required in effecting their change from a gaseous to a liquid condition, and vice versa, so that the operations may proceed without external loss and in a perfectly continuous manner.

In this invention the power of chemical affinity is made to accomplish work performed by the mechanical compression. In connection with a liquefiable gas or highly volatile liquid an absorbent is used which, at ordinary temperatures, under the proper pressure, is a liquid, and which in that condition, by the force of chemical affinity, absorbs the gas or volatilized liquid and forms therewith a binary liquid. This binary liquid constitutes the refrigerating agent. Volatilization takes place *in vacuo* therefrom, cold being produced as readily understood, and the binary liquid is re-formed at the ordinary temperatures with a comparatively small pressure—viz., that necessary for maintaining the absorbent in a liquid condition, the liquefiable gas being reduced to a liquid by absorption. The pressure heretofore required to liquefy the refrigerant after volatilization is therefore dispensed with largely, or practically altogether.

It will be readily understood that in operating with a volatile liquid which at a low temperature is gaseous only at less than atmospheric pressure, the advantage resulting from the reduction of pressure required will be less apparent, as in no case is great pressure necessary. It follows, also, from what has been said, that in general the greatest results comparatively are obtained when the difference of pressure required to maintain the absorbent and the absorbed material, gas or vapor, in a liquid state, independent of each other, is greatest, and, within certain limits, this is true. It is, however, highly important, and indeed essential to the attainment of the best results, that the absorbent should be highly volatile *in vacuo*, even at the lowest temperatures attained in practical operations, and uncongealable under any conditions to which it would be subjected. The latter quality is necessary to prevent the deposition of the absorbent as frost or in icicles, which would greatly impair the effectiveness of the machine.
When the absorbent volatilizes its affinity no longer retains the absorbed material in a liquid form, and it also volatilizes, producing cold in the same manner as though from a liquefied state due to pressure, and the volatilization of the absorbent assists in the production.

The best effects are consequently produced with a practically uncongealable and highly volatile liquid as the absorbent, and a gas liquefiable by direct compression only, under great pressure, but reducible to a liquid readily by absorption in the volatile liquid as the absorbed material.

From trial and experiment it is found that sulphuric ether, in conjunction with anhydrous sulphurous acid or ammonia, is most effective and of great practical value. The binary liquid produced by absorption of sulphurous acid or ammonia in sulphuric ether is at ordinary temperatures—say, 80° Fahrenheit or 26.5° centigrade—and atmospheric pressure homogeneous, and remains unchanged without loss of gas and without tension. It may be kept in ordinary bottles corked, special receivers not being required.

In order more clearly to explain the invention, the manner of carrying the same into effect by means of sulphuric ether and sulphurous acid or ammonia will now be more particularly described.

Sulphuric ether prepared in any ordinary or suitable way—for example, from alcohol and sulphuric acid by distillation—is placed in any desired quantity in a receiver which is connected with a pipe, through which anhydrous sulphurous acid, prepared by burning sulphur or in any known and suitable way and dried over chloride of calcium, is passed into the ether.

Instead of sulphurous acid, anhydrous ammonia, prepared from ammonium chloride (sal-ammoniac) and lime, and dried, may be admitted through the pipe into the liquid; or receptacles containing liquefied sulphurous acid or liquefied ammonia prepared for ice-machines may be connected with the receiver containing the ether, and the gas will force itself by its own elasticity into the absorbing liquid.

The manner of preparing the sulphuric ether and sulphurous acid or ammonia form of themselves no part of this invention.

The pipe conveying the gas should dip below the level of the liquid ether almost to the bottom of the receiver. Suitable means should be used to insure thorough contact, to aid the absorption, and the receiver should be kept cool, as by a water circulation. The gas is passed into the ether until the latter is saturated. This can be ascertained readily by the density of the liquid, as when it ceases to increase the saturation is complete.

For practical purposes a sufficient degree of saturation may be obtained in the following way: The sulphuric ether in a concentrated or anhydrous condition—say, fifty to one hundred pounds—is placed in a closed vessel, into which the anhydrous sulphurous acid or ammonia is introduced through a pipe extending to the bottom from a gasometer or other suitable reservoir, by means of which a pressure of a few pounds may be given. The aforesaid vessel is provided with a valve loaded with a few pounds pressure, which, when the operation is completed, is lifted and gives an alarm. Small cocks are provided for withdrawing portions of the liquid as the operation proceeds, and a large cock for drawing off the binary liquid when the operation is finished.

The binary liquid thus produced either with sulphurous acid or ammonia can be stored or sold in ordinary bottles or carboys tightly corked. Care should be taken that it is not exposed to a temperature high enough—say, 90° Fahrenheit, (32° centigrade,) or above—to volatilize the ether, or provision must be made to withstand the pressure generated, which would not, however, be very great.

In order to use and produce cold by the binary liquid a refrigerating or ice-machine of any ordinary or suitable construction, containing an aspiration and compression pump, a refrigerating coil or chamber, and a condenser, will answer. For example, what is known as the "Pictet machine" can be used. It is not necessary that the pump and other parts should be constructed with the same strength as heretofore, as much less pressure will have to be resisted in operating in accordance with this invention. The binary liquid is introduced into the apparatus in any suitable way, as by a simple siphon of lead pipe, with proper connections, opening into the refrigerating coil or chamber; or even a funnel would answer. The pump is operated by a steam-engine or other motor. The aspiration produces a vacuum above the liquid, and its two components volatilize together, producing great cold, and pass together through the pump to the condenser, where, under the restored pressure, the ether becomes liquid and reabsorbs the gas, the temperature being kept low by a water-circulation. The pressure required is that necessary to condense the ether vapors—viz., atmospheric pressure, or but little more. The binary liquid re-formed in the condenser flows into the refrigerating coil or chamber, and is used again and again.

The proportions of the several parts, the amount of charge, and the speed at which the pump is run to the attainment of the maximum effect, are matters within the discretion of the superintendent.

Certain modifications and improvements to adapt the machine specially to this invention would probably be desirable; but these would form the basis of an additional application for patent.

In working with "ethero-sulphurous dioxide," as the binary liquid produced by absorption of sulphurous acid (sulphurous dioxide) is called, or "ethero-ammonia," as that produced with ammonia is named, there is practically no danger from fire. The former hardly takes fire, and the flame is short and fuliginous, and in a limited space can easily be extinguished.

The comparative degrees of cold produced under the same conditions of weight of liquid, velocity of vaporization, and time, were, for ethero-sulphurous dioxide, a lowering per minute of 24° Fahrenheit, for ethero-ammonia, 22° Fahrenheit, and for ether alone, 15° Fahrenheit.

In practical operation with the same power expended a greater amount of cold can be obtained with the binary liquid not only than that with ether alone, but also than that produced by the vaporization of sulphurous acid or ammonia, both the latter having been liquefied by mechanical compression.

Instead of the gas and liquid named, many others may be used—for example, sulphurous acid in sulphide of carbon, absorption $1\frac{43}{100}$ per cent., lowering of temperature 15° Fahrenheit; sulphurous acid in chloroform, absorption five per cent., lowering of temperature 10° Fahrenheit; chloride of methyl in sulphuric ether, absorption less than one per cent., lowering of temperature 18° Fahrenheit, and so on for numberless other absorbents and absorbed materials, liquids, and gases. Chloroform alone would produce a lowering of 5° Fahrenheit. The temperatures given are comparative with those given before.

The proportion to which the absorption of the gases named—sulphurous acid or ammonia, &c.—can be carried is a matter to be determined from experiment, and different results will be often obtained, according to care on the part of the person superintending to push the operation to the point of actual saturation. In different experiments an absorption of sulphurous acid of from thirty-three per cent. to seventy per cent. of the weight of sulphuric ether has been found to take place, the proportion being ascertained by means of the density of the resulting liquids. By more careful experiments a higher rate of absorption might possibly be obtained.

The degree of cold above mentioned for ethero-sulphurous dioxide was obtained with an absorption of thirty-three per cent. of the weight of the ether. With seventy per cent. absorbed the degree of cold produced under the same conditions otherwise would be greater. The proportion of ammonia absorbed was six per cent. of the weight of the sulphuric ether.

We have called the refrigerating agent a "binary liquid." This must be understood of the two components—the absorbent and the absorbed—and not as excluding the idea that either or both the components could be compound—that is, composed of two or more elements, provided they were not antagonistic.

We prefer to saturate the absorbent with the absorbed gas, as the best effects are thereby produced; but it is evident that the same advantages in a less degree could be obtained with less than saturation, or by the use of ether or other absorbent, only in a proportion to produce a partial absorption of the gas in the ice-machine.

When an absorbent is used which is gaseous at ordinary pressure and temperature, it and the gas to be absorbed should be kept under the conditions necessary to retain it in a liquid, and the binary liquid formed would require a receiver of proper strength, or the two components could be introduced as gases into the circulation of the ice-machine, and the binary liquid formed by its operation.

Having thus fully described our said invention, and the manner in which the same is or may be carried into effect, what we claim and desire to secure by Letters Patent, is—

1. The process of producing cold for the manufacture of ice and other purposes, the same consisting in causing volatilization by means of a vacuum or partial vacuum from a binary liquid composed of a suitable absorbent, and a volatile absorbed material having affinity therefor, re-forming the binary liquid by restoration of pressure and the affinity of the gas or vapor of the absorbed material for the absorbent, and repeating the operations continuously, substantially as described.

2. The process of producing cold for the manufacture of ice and other purposes, which consists in volatilizing a binary liquid of which one component is more volatile than the other, and held in absorption by its affinity therefor, and both being practically uncongealable, restoring the binary liquid by the condensation of the less volatile component and the absorption of the other, and repeating the operation continuously, substantially as described.

3. A refrigerating agent consisting of a binary liquid of which one component is a highly volatile and practically uncongealable liquid or liquefied gas, and the other a more volatile material held in absorption thereby, substantially as described.

4. A binary liquid adapted to serve as a refrigerating agent, composed of sulphuric ether holding in absorption anhydrous sulphurous acid or its specified equivalent—ammonia—substantially as described.

In testimony whereof we have signed this specification in the presence of two subscribing witnesses.

C. TESSIÉ DU MOTAY.
AUGUSTE I. ROSSI.

Witnesses:
E. GILLER,
LEONARD F. BECKWITH.